United States Patent
Malpani et al.

(10) Patent No.: US 7,373,549 B2
(45) Date of Patent: May 13, 2008

(54) ERROR DETECTION AND RECOVERY IN A STORAGE DRIVER

(75) Inventors: Navneet Malpani, Austin, TX (US); Xuebin Yao, Austin, TX (US); Charles A. Musta, Austin, TX (US); Mikal N. Hart, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 10/819,416

(22) Filed: Apr. 6, 2004

(65) Prior Publication Data

US 2005/0223279 A1 Oct. 6, 2005

(51) Int. Cl.
*G06F 11/00* (2006.01)

(52) U.S. Cl. .............. 714/17; 714/4; 714/15; 714/16; 719/321; 719/326

(58) Field of Classification Search .......... 714/17; 719/326, 321
See application file for complete search history.

(56) References Cited

U.S. PATENT DOCUMENTS

| | | | | |
|---|---|---|---|---|
| 5,307,491 | A * | 4/1994 | Feriozi et al. | 719/326 |
| 6,493,772 | B1 * | 12/2002 | Hughes | 710/19 |
| 6,574,755 | B1 * | 6/2003 | Seon | 714/56 |
| 6,918,054 | B2 * | 7/2005 | Hirata et al. | 714/17 |
| 7,089,587 | B2 * | 8/2006 | Allen et al. | 726/14 |
| 2002/0103943 | A1 * | 8/2002 | Lo et al. | 710/2 |
| 2004/0093607 | A1 * | 5/2004 | Elliott | 719/326 |
| 2005/0138466 | A1 * | 6/2005 | Spry | 714/6 |
| 2005/0259632 | A1 | 11/2005 | Malpani et al. | |

OTHER PUBLICATIONS

"Transmission Control Protocol", Defense Advanced Research Projects Agency, Sep. 1981, pp. 1-88 [retrieved online Aug. 2, 2006], http://rfc.net/rfc793.txt.

Krueger et al., "Small Computer Systems Interface Protocol over the Internet (iSCSI) Requirements and Design Considerations", The Internet Society, Jul. 2002, pp. 1-23.

"Information Technology—SCSI Architecture Model—2 (SAM-2)", dpANS, T10 Project 1157-D, Sep. 2002, pp. 1-113.

Satran, et al., "iSCSI", Jan. 2003, pp. 1-281, [retrieved online Aug. 2, 2006], http://www3.ietf.org/proceedings/03mar/I-D/draft-ietf-ips-iscsi-20.txt.

* cited by examiner

Primary Examiner—Yolanda L Wilson
(74) Attorney, Agent, or Firm—Konrad Raynes & Victor LLP; Rabindranath Dutta

(57) ABSTRACT

A command is received, at a network storage driver, from an operating system storage stack, wherein the command is for communication with a target storage device over a connection across a network. The command is selectively executed, a plurality of times over the connection, for communicating with the target storage device, in response to a determination that the command failed to successfully communicate with the target storage device within a threshold period of time.

25 Claims, 4 Drawing Sheets

ERROR DETECTION AND RECOVERY IN A STORAGE DRIVER

BACKGROUND

Internet Small Computer Systems Interface (iSCSI) is a protocol that defines methods for transporting Small Computer Systems Interface (SCSI) commands and data. The commands and data may be exchanged with input/output (I/O) devices that support the Transmission Control Protocol (TCP). The iSCSI protocol is a transport protocol for SCSI commands and data that may be implemented over TCP.

Further details of TCP are described in the publication entitled "Transmission Control Protocol: DARPA Internet Program Protocol Specification," prepared for the Defense Advanced Projects Research Agency (RFC 793, published September 1981). Further details of the iSCSI protocol are described in the publications entitled "Small Computer Systems Interface protocol over the Internet (iSCSI): Requirements and Design Considerations," prepared by the Internet Engineering Task Force (RFC 3347, published July 2002) and "iSCSI," prepared by the IP Storage Working Group of the Internet Engineering Task Force (Internet Draft draft-ietf-ips-iscsi-20.txt, published Jan. 19, 2003). Further details of the SCSI protocol are described in the publication entitled "SCSI Architecture Model-2" published by T10 Technical Committee of the InterNational Committee on Information Technology Standards (published Sep. 11, 2002).

The iSCSI protocol allows the block-level transfer of data over a network. From a server's perspective, the iSCSI protocol may allow network cards to function as storage area network controllers. The iSCSI protocol may also allow shared storage solutions such as tape drives and Redundant Array of Independent disks (RAID) units to be shared over TCP.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
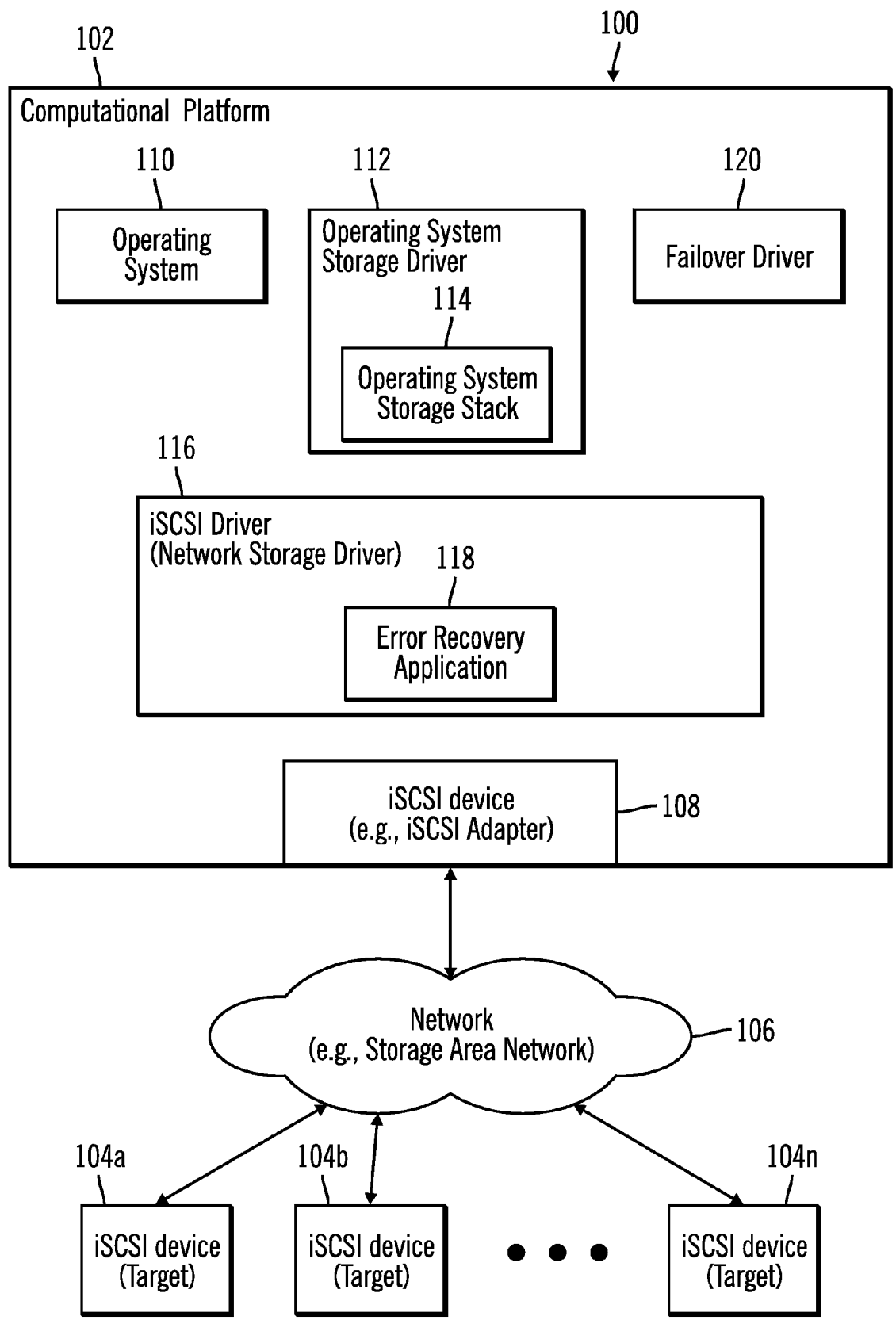
FIG. 1 illustrates a computing environment, in accordance with certain embodiments.

FIG. 1 illustrates a computing environment 100, in accordance with certain embodiments. A computational platform 102 is coupled to a plurality of iSCSI devices 104a ... 104n over a network 106. The computational platform 102 may communicate commands and data with the iSCSI devices 104a ... 104n via an iSCSI device 108 coupled to the computational platform 102. In certain embodiments, the iSCSI device 108 may function as a source device and the iSCSI devices 104a ... 104n may function as target devices.

The computational platform 102 may comprise a personal computer, a workstation, a server, a mainframe, a hand held computer, a palm top computer, a laptop computer, a telephony device, a network computer, a blade computer, or any other computing device. The iSCSI devices 104a ... 104n may include any device capable of supporting the iSCSI or other network storage protocols. In certain embodiments, the iSCSI devices 104a ... 104n are target devices for the iSCSI device 108 of the computational platform 102.

The network 106 may comprise the Internet, an intranet, a Local area network (LAN), a Storage area network (SAN), a Wide area network (WAN), a wireless network, etc. For example, in certain embodiments the network 106 may comprise a SAN. In such embodiments, source iSCSI device 108 in the computational platform 102 communicates iSCSI commands to the target iSCSI devices 104a ... 104n over the SAN 106. In certain additional embodiments, the network 106 may be part of one or more larger networks or may be an independent network or may be comprised of multiple interconnected networks.

In certain embodiments, the computational platform 102 may comprise an operating system 110, an operating system storage driver 112 having an operating system storage stack 114, an iSCSI driver 116 having an error recovery application 118, and a failover driver 120.

The Operating system 110 may comprise the MICROSOFT WINDOWS* Operating System, the UNIX* operating system, or certain other operating systems. The operating system storage driver 112 may implement a SCSI storage protocol in the operating system storage stack 114. In certain alternative embodiments, the operating system storage driver 112 implements a protocol that does not directly support networked storage operations. For example, in certain exemplary embodiments the operating system storage driver 112 is not able to directly perform operations with the iSCSI devices 104a ... 104n over the network 106. The operating system storage driver 112 may expose interfaces that may be used by other drivers in the computational platform. In certain embodiments the operating system storage driver 112 may be implemented in the kernel of the operating system 110, whereas in certain other embodiments the operating system storage driver 112 may be implemented outside the kernel of the operating system 110.

The iSCSI driver 116 may be a device driver for the iSCSI device 108. For example, in certain embodiments if the iSCSI device is an iSCSI adapter then the iSCSI driver 116 may be a device driver for the iSCSI adapter 108. In alternative embodiments, the iSCSI device 108 may be a network adapter, such as, as TCP Offload Engine (TOE) adapter. The iSCSI driver 116 may include functions for sending and receiving commands according to the iSCSI protocol over the network 106. The error recovery application 118 may include functions for detecting and recovering from errors in the process of communicating via the iSCSI protocol over the network 106. In certain alternative embodiments, the iSCSI driver 116 may implement a network protocol that is different from iSCSI.

The failover driver 120 is an application that allows iSCSI commands that generate failure to be processed according to logic implemented in the failover driver 120. While in the embodiments the failover driver 120 is illustrated outside the iSCSI driver 116, in certain alternative embodiments the failover driver 120 may be implemented in the iSCSI driver 116.

FIG. 1 illustrates certain embodiments in which the iSCSI driver 116 implements an iSCSI interface over the SCSI interface implemented by the operating system storage driver 112. The error recovery application 118 implemented in the iSCSI driver 116 is capable of detecting and recovering from error caused while communicating with the target iSCSI devices 104a . . . 104n.

Figure 2:
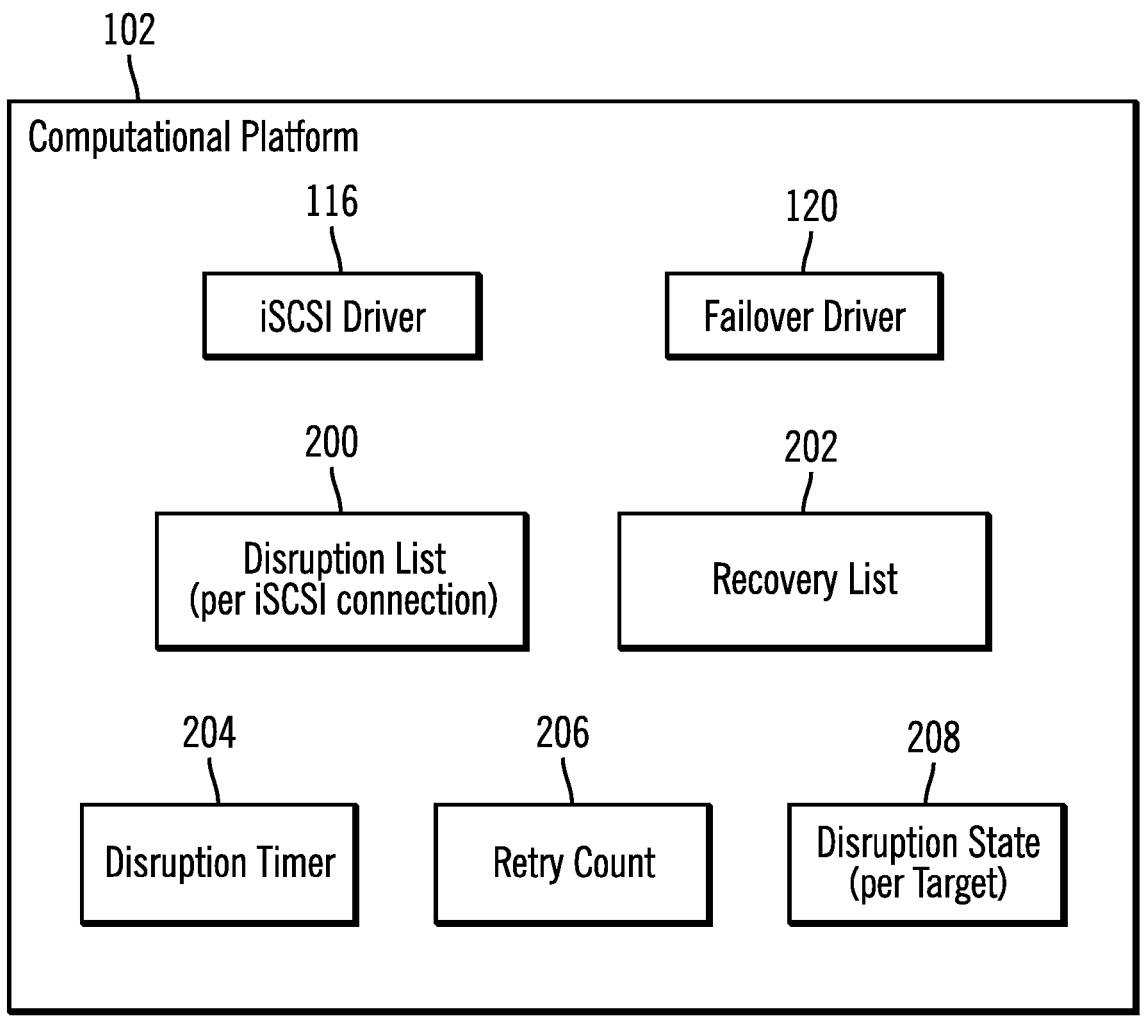
FIG. 2 illustrates data structures and applications implemented in a computational platform, in accordance with certain embodiments.

FIG. 2 illustrates data structures and applications implemented in the computational platform 102, in accordance with certain embodiments.

In addition to the iSCSI driver 116 and the failover driver 120, the computational platform 102 may further comprise data structures representing a disruption list 200, a recovery list 202, a disruption timer 204, a retry count 206 and a disruption state 208.

The disruption list 200 may be implemented as a queue. Commands that fail to execute successfully in the iSCSI driver 116 in a first attempt may be inserted into the disruption list 200. There may be a plurality of disruption lists, with one disruption list corresponding to one iSCSI connection established between an initiator, such as, the iSCSI device 108 and an iSCSI target, such as, the iSCSI device 104b. In certain embodiments, commands inserted into the disruption list 200 are retried a plurality of times with an existing network connection to a target iSCSI device.

The recovery list 202 may be implemented as a queue. Commands that fail to execute successfully after being inserted into the disruption list 200 may be inserted into the recovery list 202. Commands that are inserted into the recovery list 202 may be retried with a new network connection to a target iSCSI device.

The disruption timer 204 may be a countdown timer that counts down from a certain threshold period of time. For example, in certain embodiments the disruption timer 204 may be set to 100 ms and after the disruption timer 204 counts down for 100 ms, the disruption timer 204 may communicate the expiry of the disruption timer 204 to the iSCSI driver 116. In certain embodiments, if an iSCSI command does not execute successfully before the expiry of the associated disruption timer 204, the iSCSI command is considered to have failed. In certain embodiments, the value for the disruption timer 204 may be marginally smaller than a SCSI stack timer (not shown) set by the operating system storage stack 114. In alternative embodiments, such as, in the LINUX operating system, the SCSI stack timer may be disabled by calling the scsi_delete_timer( ) procedure.

The retry count 206 indicates the number of times a command inserted into the disruption list 200 is retried with an existing network connection. The retry count 206 may be user defined. In certain embodiments, when a command is inserted into the disruption list 200, the corresponding network connection is indicated to be in the disruption state 208. In certain embodiments, there is one disruption state per target.

FIG. 2 illustrates certain embodiments in which the iSCSI driver 116 performs error detection and recovery for iSCSI commands by using the disruption list 200 and the recovery list 202. A command is inserted into the disruption list 200, if the command fails during a first attempt to execute the command. Once a command in the disruption list 200 has failed for the plurality of times the command is moved to the recovery list 202 and a new network connection is established with the target to retry the command.

Figure 3:
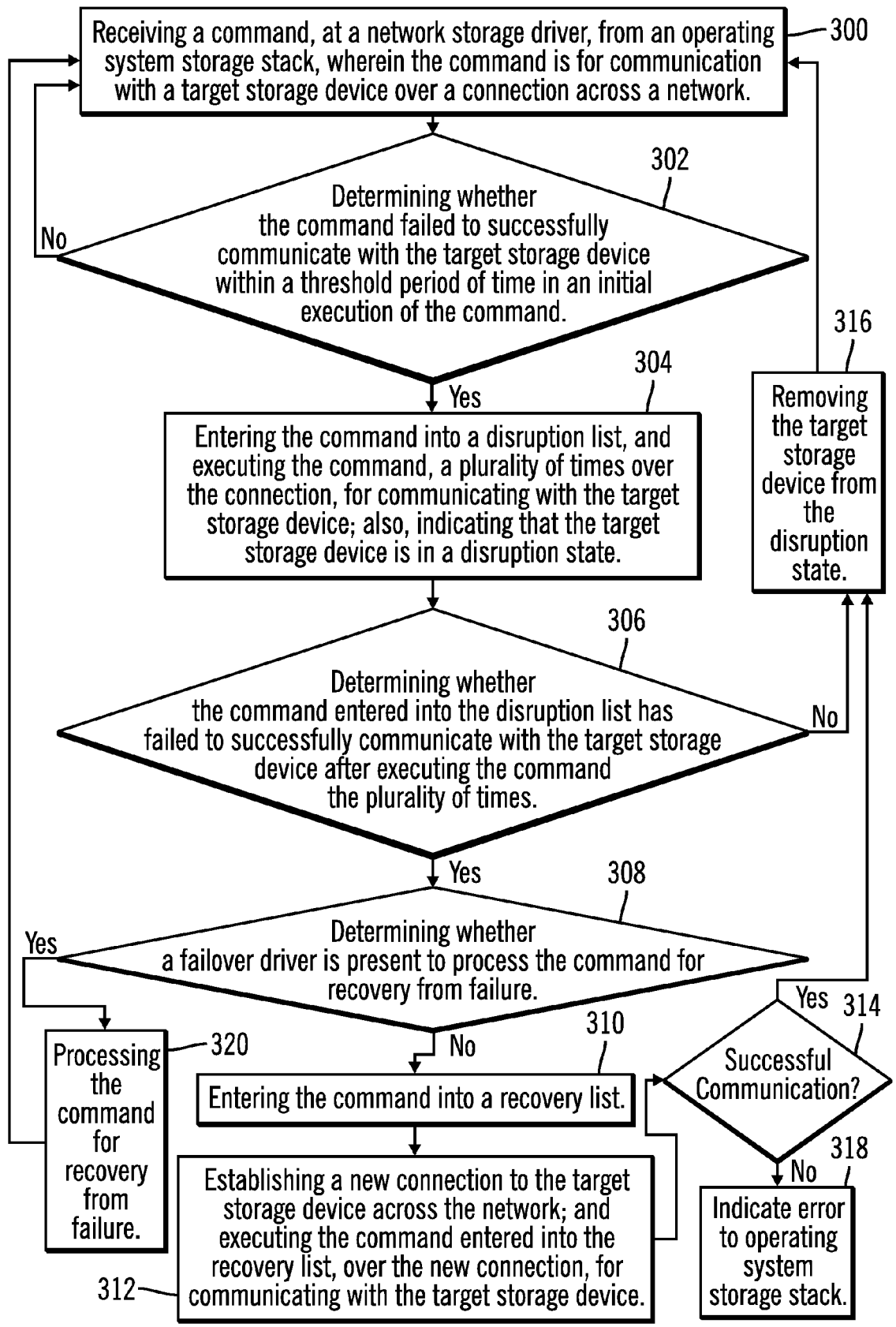
FIG. 3 illustrates operations implemented in an iSCSI driver, in accordance with certain embodiments.

FIG. 3 illustrates operations implemented in the iSCSI driver 116, in accordance with certain embodiments.

Control starts at block 300, where a network storage driver, such as, the iSCSI driver 116 receives a command, from the operating system storage stack 114, wherein the command is for communication with a target storage device, such as, the target 104b over a connection across the network 106.

The iSCSI driver 116 determines (at block 302) whether the command failed to successfully communicate with the target storage device within a threshold period of time in an initial execution of the command. In certain embodiments the threshold period of time may be stored in the disruption timer 204 that counts down from the threshold period of time.

If the iSCSI driver 116 determines (at block 302) that the command failed to successfully communicate with the target storage device then the iSCSI driver 116 enters (at block 304) the command into a disruption list 200 corresponding to the established connection with the target storage device. The iSCSI driver 116 executes the command, a plurality of times over the already established connection, for communicating with the target storage device. The plurality of times the command executes may be at most the retry count 206. Additionally, in certain embodiments, the iSCSI driver 116 may also indicate that the target storage device is in a disruption state 208.

The iSCSI driver 116 determines (at block 306) whether the command entered into the disruption list 200 has failed to successfully communicate with the target storage device after executing the command the plurality of times.

If the iSCSI driver 116 determines (at block 306) that the command entered into the disruption list 200 has failed after executing the command the plurality of times, then the iSCSI driver 116 determines (at block 308) whether a failover driver 120 exists to process the command for recovery from failure. If no failover driver 120 exists, then the iSCSI driver 116 enters (at block 310) the command into the recovery list 202.

The iSCSI driver 116 establishes (at block 312) a new connection to the target storage device across the network 106. The iSCSI driver 116 executes the command entered into the recovery list 202, over the new connection, for communicating with the target storage device. In certain embodiments, the iSCSI driver 116 determines (at block 314) if the communication with the target storage device is successful. If so, the iSCSI driver 116 removes (at block 316) the target storage device from the disruption state 208. If not, the iSCSI driver 116 may indicate (at block 318) an error to the operating system storage stack 114. In certain embodiments, the iSCSI device 108 may be reset and data corruption or file system errors may occur.

If the iSCSI driver 116 determines (at block 302) that the command successfully communicated with the target storage device then control returns to block 300 for processing the next command. If the iSCSI driver 116 determines (at block 306) that the command entered into the disruption list 200 had not failed after executing the command the plurality of times, then the iSCSI driver removes (at block 316) the target storage device from the disruption state 208. If the iSCSI driver 116 determines (at block 308) that a failover driver 120 exists, the iSCSI driver 116 processes (at block 320) the command for recovery from failure and receives (at block 300) the next command.

In certain embodiments the iSCSI driver 116 performs error detection and recovery for iSCSI commands. In certain embodiments, where the failover driver 120 remains unused, the processing overhead associated with the use of the failover driver 120 is eliminated. In the presence of the failover driver 120, the iSCSI driver 116 may enhance the capabilities of the failover driver 120 by providing a mechanism for fallback to the original error path if that path is restored by the error detection and recovery mechanism. Certain embodiments may improve the reliability of the storage area network 106 for processing network commands.

Certain embodiments may be implemented in any iSCSI based driver for any iSCSI host bus adapter, such as, the iSCSI device 108. Possible cases of failure in a SAN configuration that may detected include iSCSI protocol failures, packets errors, connection failure in the path from an initiator to a specific iSCSI target, response errors, failure of a host bus adapter on the initiator side, failure of a host bus adapter or a disk on the target side, etc.

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed. Furthermore, program logic that includes code may be implemented in hardware, software, firmware or any combination thereof.

Figure 4:
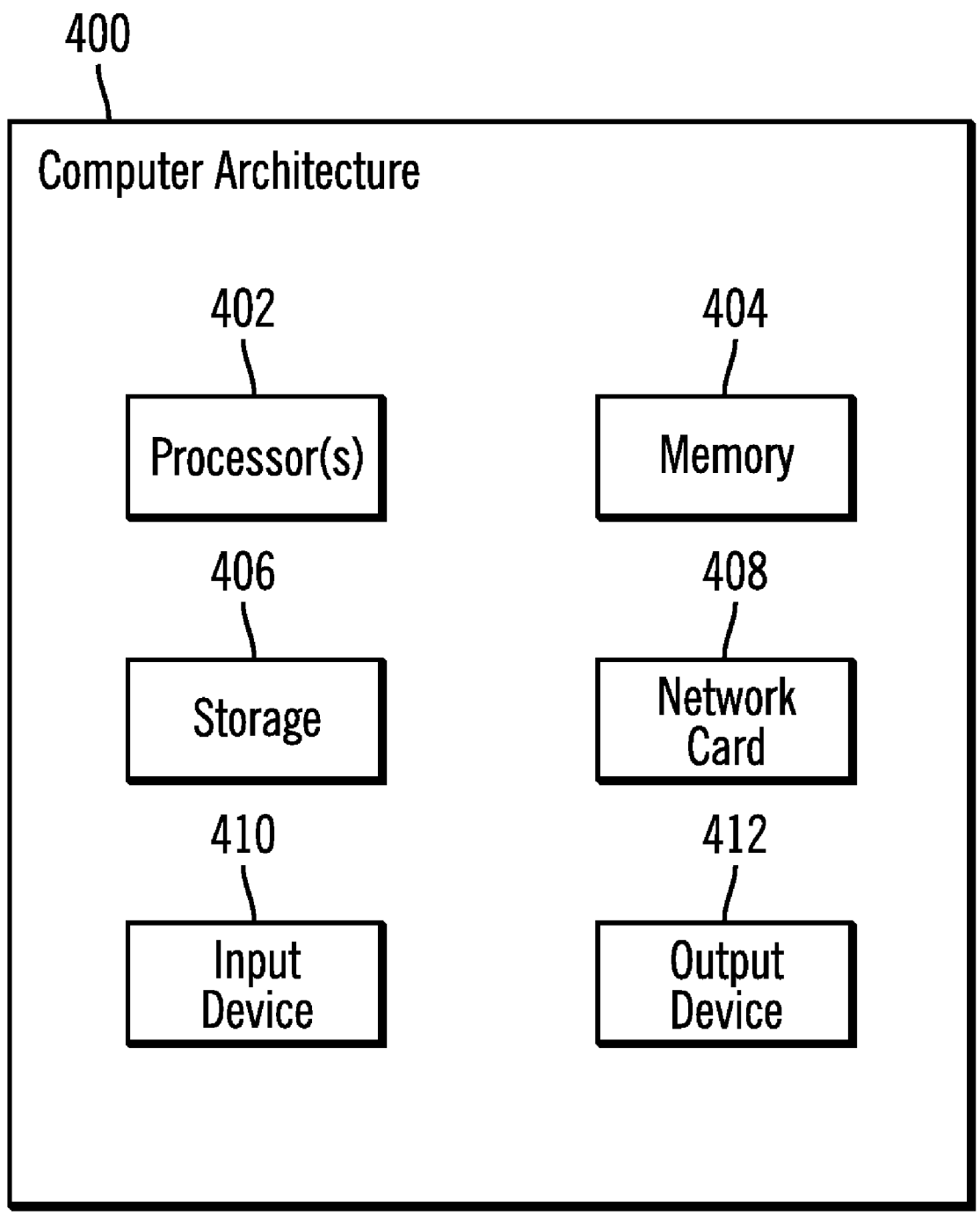
FIG. 4 illustrates a block diagram of a computer architecture for certain elements of the computing environment, in accordance with certain embodiments.

FIG. 4 illustrates a block diagram of a computer architecture in which certain embodiments are implemented. FIG. 4 illustrates one embodiment of the computational platform 102 and the iSCSI device 108. The computational platform 104 and the iSCSI device 108 may implement a computer architecture 400 having one or more processors 402, a memory 404 (e.g., a volatile memory device), and storage 406. Not all elements of the computer architecture 400 may be found in the computational platform 102 and the iSCSI device 108. The storage 406 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 406 may comprise an internal storage device, an attached storage device and/or a network accessible storage device. Programs in the storage 406 may be loaded into the memory 404 and executed by the one or more processors 402 in a manner known in the art. The architecture may further include a network card 408 to enable communication with a network. The architecture may also include one input device 410, such as a keyboard, a touchscreen, a pen, voice-activated input, etc., and one output device 412, such as a display device, a speaker, a printer, etc.

In certain embodiments, the iSCSI device 108, may be included in a computer system including any storage controller, such as, a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. In alternative embodiments, the iSCSI device 108 may be included in a system that does not include a storage controller, such as certain hubs and switches.

Certain embodiments may be implemented in a computer system including a video or graphics controller to render information to display on a monitor coupled to the computer system including the iSCSI device 108, where the computer system may comprise a desktop, workstation, server, mainframe, laptop, handheld computer, etc. An operating system may be capable of execution by the computer system, and the video controller may render graphics output via interactions with the operating system. Alternatively, some embodiments may be implemented in a computer system that does not include a video or graphics controller, such as a switch, router, etc. Furthermore, in certain embodiments the device may be included in a card coupled to a computer system or on a motherboard of a computer system.

At least certain of the operations of FIG. 3 can be performed in parallel as well as sequentially. In alternative embodiments, certain of the operations may be performed in a different order, modified or removed. In alternative embodiments, certain operations of FIGS. 3 may be implemented in the iSCSI device 108. Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-4 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for communicating with a target storage device over a network, comprising:

receiving a command, at a network storage driver, from an operating system storage stack, wherein the command is for communication with the target storage device over a connection across the network; and selectively executing the command, a plurality of times over the connection, for communicating with the target storage device, in response to a determination that the command failed to successfully communicate with the target storage device within a threshold period of time, wherein the method further comprises selectively entering the command into a disruption list, prior to executing the command the plurality of times.

2. The method of claim 1, further comprising:
selectively processing the command for recovery from failure, in response to the command entered into the disruption list having failed to successfully communicate with the target storage device after executing the command the plurality of times, and in response to a presence of a failover driver to process the command for recovery from failure.

3. The method of claim 1, further comprising:
selectively entering the command into a recovery list, in response to the command entered into the disruption list having failed to successfully communicate with the target storage device after executing the command the plurality of times and in response to an absence of a failover driver to process the command for recovery from failure.

4. The method of claim 3, further comprising:
establishing a new connection to the target storage device across the network;
executing the command entered into the recovery list, over the new connection, for communicating with the target storage device.

5. The method of claim 1, further comprising:
indicating that the target storage device is in a disruption state, in response to entering the command into the disruption list; and
selectively removing the target storage device from the disruption state, in response to a successful communication of the command with the target storage device within the threshold period of time.

6. The method of claim 1, wherein the command failed to successfully communicate with the target storage device within the threshold period of time, if a disruption timer that starts by indicating the threshold period of time expires or if an error occurs before an expiry of the disruption timer.

7. The method of claim 1, wherein the network storage driver implements an Internet Small Computer Systems Interface protocol for communicating with the target storage device, wherein the threshold period of time can be changed, and wherein the plurality of times the command is executed can be changed.

8. A system capable of communicating with a target storage device over a network comprising:
a memory;
a processor; and
program logic including code stored in the memory, wherein the program logic is capable of causing the processor to be operable to:
receive a command, at a network storage driver, from an operating system storage stack, wherein the command is for communication with the target storage device over a connection across the network; and
selectively execute the command, a plurality of times over the connection, for communicating with the target storage device, in response to a determination that the command failed to successfully communicate with the target storage device within a threshold period of time, wherein the program logic is further capable of causing the processor to be operable to selectively enter the command into a disruption list, prior to executing the command the plurality of times.

9. The system of claim 8, wherein the program logic is further capable of causing the processor to be operable to:
selectively process the command for recovery from failure, in response to the command entered into the disruption list having failed to successfully communicate with the target storage device after executing the command the plurality of times, and in response to a presence of a failover driver to process the command for recovery from failure.

10. The system of claim 8, wherein the program logic is further capable of causing the processor to be operable to:
selectively enter the command into a recovery list, in response to the command entered into the disruption list having failed to successfully communicate with the target storage device after executing the command the plurality of times and in response to an absence of a failover driver to process the command for recovery from failure.

11. The system of claim 10, wherein the program logic is further capable of causing the processor to be operable to:
establish a new connection to the target storage device across the network;
execute the command entered into the recovery list, over the new connection, for communicating with the target storage device.

12. The system of claim 8, wherein the program logic is further capable of causing the processor to be operable to:
indicate that the target storage device is in a disruption state, in response to entering the command into the disruption list; and
selectively remove the target storage device from the disruption state, in response the command having successfully communicated with the target storage device within the threshold period of time.

13. The system of claim 8, further comprising:
a disruption timer coupled to the processor, wherein the command fails to successfully communicate with target storage device within the threshold period of time, if the disruption timer that starts by indicating the threshold period of time expires or if an error occurs before an expiry of the disruption timer.

14. The system of claim 8, wherein the network storage driver implements an Internet Small Computer Systems Interface protocol for communicating with the target storage device, wherein the threshold period of time can be changed, and wherein the plurality of times the command is executed can be changed.

15. A system capable of communicating with a target storage device over a network comprising:
a computational platform;
a storage controller implemented in the computational platform;
a memory;
a processor coupled to the computational platform;
a host bus adapter coupled to the computational platform; and
program logic including code stored in the memory, wherein the program logic is capable of causing the processor to be operable to:
receive a command, at a network storage driver, from an operating system storage stack, wherein the command is for communication with the target storage device over a connection across the network; and
selectively execute the command, a plurality of times over the connection, for communicating with the target storage device, in response to a determination that the command failed to successfully communicate with the target storage device within a threshold period of time, wherein the program logic is further capable of causing the processor to be operable to selectively enter the command into a disruption list, prior to executing the command the plurality of times.

16. The system of claim 15, wherein the program logic is further capable of causing the processor to be operable to:
selectively enter the command into a recovery list, in response the command entered into the disruption list having failed to successfully communicate with the target storage device after executing the command the plurality of times and in response to an absence of a failover driver to process the command for recovery from failure.

17. The system of claim 15, wherein the program logic is further capable of causing the processor to be operable to:
selectively enter the command into a recovery list, in response to the command entered into the disruption list having failed to successfully communicate with the target storage device after executing the command the plurality of times and in response to an absence of a failover driver to process the command for recovery from failure.

18. The system of claim 17, wherein the program logic is further capable of causing the processor to be operable to:
establish a new connection to the target storage device across the network;
execute the command entered into the recovery list, over the new connection, for communicating with the target storage device.

19. An article of manufacture, comprising a storage medium having stored therein instructions capable of being executed by a machine to:
receive a command, at a network storage driver, from an operating system storage stack, wherein the command is for communication with a target storage device over a connection across a network; and
selectively execute the command, a plurality of times over the connection, for communicating with the target storage device, in response to a determination that the command failed to successfully communicate with the target storage device within a threshold period of time, wherein the instructions are further capable of being executed to selectively enter the command into a disruption list, prior to executing the command the plurality of times.

20. The article of manufacture of claim 19, wherein the instructions are further capable of being executed to:
selectively process the command for recovery from failure, in response to that the command entered into the disruption list having failed to successfully communicate with the target storage device after executing the command the plurality of times, and in response to a presence of a failover driver to process the command for recovery from failure.

21. The article of manufacture of claim 19, wherein the instructions are further capable of being executed to:
selectively enter the command into a recovery list, in response to the command entered into the disruption list having failed to successfully communicate with the target storage device after executing the command the plurality of times and in response to an absence of a failover driver to process the command for recovery from failure.

22. The article of manufacture of claim 21, wherein the instructions are further capable of being executed to:
establish a new connection to the target storage device across the network;
execute the command entered into the recovery list, over the new connection, for communicating with the target storage device.

23. The article of manufacture of claim 19, wherein the instructions are further capable of being executed to:
indicate that the target storage device is in a disruption state, in response to entering the command into the disruption list; and
selectively remove the target storage device from the disruption state, in response to the command having successfully communicated with the target storage device within the threshold period of time.

24. The article of manufacture of claim 19, wherein the command failed to successfully communicated with target storage device within the threshold period of time, if a disruption timer that starts by indicating the threshold period of time expires or if an error occurs before an expiry of the disruption timer.

25. The article of manufacture of claim 19, wherein the network storage driver implements an Internet Small Computer Systems Interface protocol for communicating with the target storage device, wherein the threshold period of time can be changed, and wherein the plurality of times the command is executed can be changed.

* * * * *